United States Patent [19]
Been

[11] 3,745,357
[45] July 10, 1973

[54] METHOD AND APPARATUS FOR MEASURING ELECTROMAGNETIC RADIATION

[75] Inventor: Julian F. Been, Medina, Ohio

[73] Assignee: The United States of America as represented by the Administrator of the National Aeronautics and Space Administration, Washington, D.C.

[22] Filed: Jan. 6, 1971

[21] Appl. No.: 104,346

[52] U.S. Cl. .......................... 250/336, 307/308
[51] Int. Cl. .................... G01t 1/24, H01l 15/00
[58] Field of Search .................... 250/83.3 R; 324/60 B, 61 B; 317/234

[56] References Cited
UNITED STATES PATENTS 3,173,091   3/1965   Perlman et al. .................. 317/234
3,173,091   3/1965   Strull ............................ 250/83.3 R
2,718,620   9/1955   Howe ............................. 324/61 B
3,396,318   8/1968   Chow ............................. 250/83.3 R
3,598,997   8/1971   Baertsch ........................ 250/83.3 R
2,155,509   4/1939   Schroter ........................ 250/210 X
2,839,678   6/1958   DeWitz .......................... 250/83.3 R
2,862,416   12/1958  Doyle ........................... 250/211 R
2,963,576   12/1960  Enikeieff ....................... 250/83.3 R

*Primary Examiner*—Herman Karl Saalbach
*Attorney*—N. T. Musial, J. A. Mackin and John R. Manning

[57] ABSTRACT

An apparatus and method wherein the capacitance of a semi-conductor junction subjected to an electromagnetic radiation field is utilized to indicate the intensity or strength of the electromagnetic radiation is described.

3 Claims, 1 Drawing Figure

Patented July 10, 1973 3,745,357
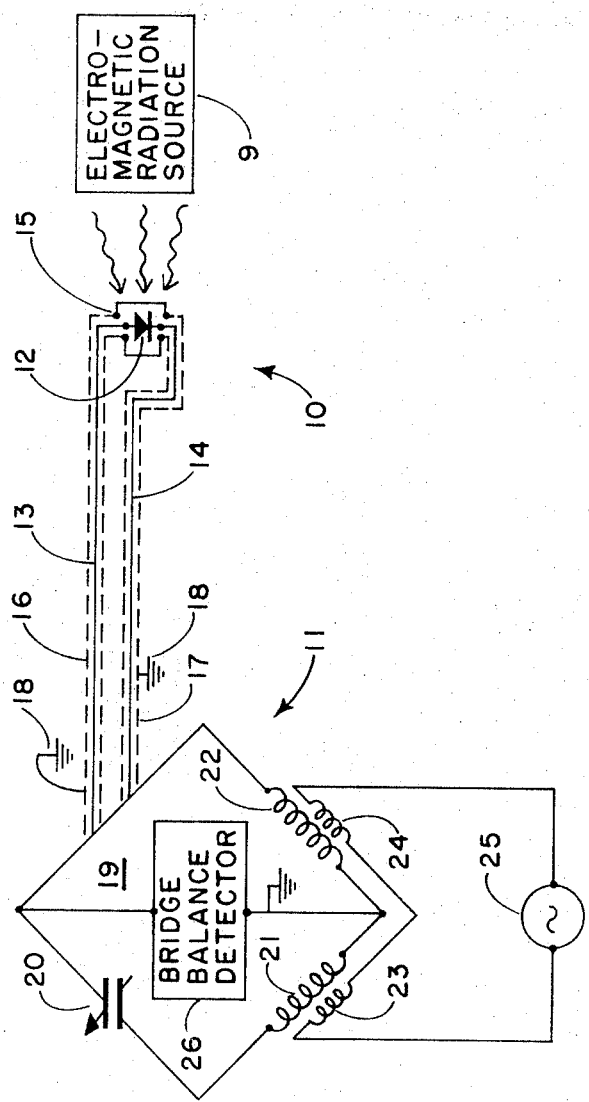
INVENTOR
JULIAN F. BEEN
BY Norman T. Musial
James A. Mackin
ATTORNEYS

METHOD AND APPARATUS FOR MEASURING ELECTROMAGNETIC RADIATION

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

This invention relates to measuring instruments and is directed more particularly to a method and apparatus for measuring electromagnetic radiation.

Up to the present time, one of the most common ways of measuring gamma radiation emitted from radioactive materials has been to utilize an ionization chamber system. Such systems require relatively high voltage, have considerable background noise, and are expensive because of the power supplies, high voltage cabling and instrumentation which must be incorporated in such a system. Furthermore, even miniature-type ion chambers are often larger than desired for use in nuclear reactor work.

Some devices have been constructed which utilize semiconductor diodes to measure gamma radiation. However, these devices are generally based upon the change of conductance or photovoltaic effect of the diode as a function of electromagnetic radiation intensity. Because the conductance photovoltage and photocurrent of a diode do not change linearly with respect to the change in strength of electromagnetic radiation, complicated correction and calibrating circuits must be provided.

As is well known, visible light has been measured in the past by light meters. Such instruments use a semiconductor junction which generates a voltage when subjected to visible light.

OBJECTS AND SUMMARY OF THE INVENTION

It is an object of the invention to provide a new and novel semiconductor electromagnetic radiation measuring device.

It is another object of the invention to provide an apparatus and method for utilizing a relatively linear characteristic of a semiconductor junction to measure electromagnetic radiation.

Still another object of the invention is to provide a method and apparatus which utilizes a-c in measuring and detecting sections of the apparatus to minimize background noise.

It is another object of the invention to provide a method and apparatus for accurately measuring electromagnetic radiation in a field which may also include neutrons.

In summary, the inventive method and apparatus accurately measure electromagnetic radiation without excessive background noise and in the presence of neutrons and at low cost.

DESCRIPTION OF THE DRAWINGS

The single FIGURE is a schematic diagram of apparatus embodying the invention.

DESCRIPTION OF THE PREFERRED EMBODIMENT

Referring to the single FIGURE, it will be seen that an electromagnetic radiation detector embodying the invention may include a detecting section 10 and a measuring section 11. The detecting section comprises a semiconductor junction such as semiconductor diode 12 which has a P-N junction. The cathode and anode of the diode 12 are connected via signal carrying leads 13 and 14 into one arm of a bridge 19. Where the radiation to be measured consists of gamma rays or X-rays, a light-tight housing 15 may enclose the diode 12. The housing 15 may be either plastic or metal. However, if a metal housing 15 is used, those skilled in the art of gamma and X-rays will realize that various metals and different thicknesses of metals may be utilized to construct the housing 15 so that certain desired wavelengths may be filtered or blocked. For example, aluminum, beryllium and titanium will block all visible and ultraviolet light but will transmit soft and hard X-rays.

To prevent undesirable background noise from being added to the signal on the leads 13 and 14, shields 16 and 17, respectively, are provided for those leads. The shields 16 and 17 are grounded as at 18.

As indicated previously, the diode 12 is connected into one arm of a bridge 19. A second arm of the bridge 19 includes a variable capacitor 20 while third and fourth arms include secondary windings 21 and 22, respectively. Primary windings 23 and 24 impress high frequency alternating current from the a-c signal generator 25 on the secondary windings 21 and 22, respectively. The alternating signal must be small enough so that the diode 12 is not forward biased to any significant extent.

To determine when the bridge 19 is balanced, that is when the capacitance of diode 12 is equal to the capacitance of variable capacitor 20, a bridge null or balance detector such as a meter 26 is connected from a point between first and second arms to a point between the third and fourth arms of the bridge. This latter point is grounded.

In accordance with the method of the invention, the diode 12 is placed in an electromagnetic radiation field, such as a gamma field which may include neutrons. The capacitor 20 is then adjusted to obtain balance of the bridge 19 at which point the capacitance of capacitor 20 is equal to the capacitance of a diode 12. Therefore, if the capacitance of the diode 12 is known for an electromagnetic radiation field of a certain intensity, then the capacitance reading is a direct measurement of the strength of the electromagnetic radiation. Thus it will be seen, that by subjecting the diode 12 to known electromagnetic radiation fields the capacitor 20 may be calibrated to read directly in any desired units of electromagnetic radiation field strength measurements. Advantageously, the capacitance of the junction of the diode 12 is directly proportional, for particular ranges, to the amount of ionizing radiation to which it is subjected. Accordingly, calibration of the radiation measuring device embodying the invention is very simple and straightforward. From the foregoing it will be seen that the invention provides a measure of magnetic radiation intensity by measuring a relatively linearly varying disk characteristic as a function of electromagnetic radiation field strength. That device is also inexpensive and is not sensitive to background electrical noise.

It will be understood that changes and modifications may be made to the foregoing invention by those skilled in the art without departing from the spirit and scope of the invention as set forth in the claims appended hereto.

What is claimed is:

1. A gamma radiation measuring device comprising:
   a semiconductor device at least one p-n junction;
   a light-tight metal enclosure disposed around said semiconductor device, said metal being selected from the group consisting of aluminum, beryllium and titanium;
   an A-C capacitance bridge; and
   signal carrying means connecting said last named means to said p-n junction of said semiconductor device whereby the capacitance of said one junction of said semiconductor device may be measured when said semiconductor is subjected to gamma radiation to indicate the intensity of said gamma radiation.

2. The radiation measuring device of claim 1 wherein said semiconductor device is a diode.

3. A method of measuring gamma radiation comprising the steps of:
   disposing a p-n junction in a gamma field of unknown strength;
   measuring the capacitance of said junction with an AC capacitance bridge to obtain a measurement of the known field strength;
   shielding said junction from electromagnetic radiation of a predetermined range of wave-lengths;
   disposing said junction in a gamma field of unknown strength; and
   measuring the capacitance of said junction with an a-c capacitance bridge to determine the magnitude of gamma radiation of said field of unknown strength.

* * * * *